C. H. HAESELER.
VALVE OR COCK AND STRAINER THEREFOR.
APPLICATION FILED OCT. 25, 1915.
1,185,309.
Patented May 30, 1916.
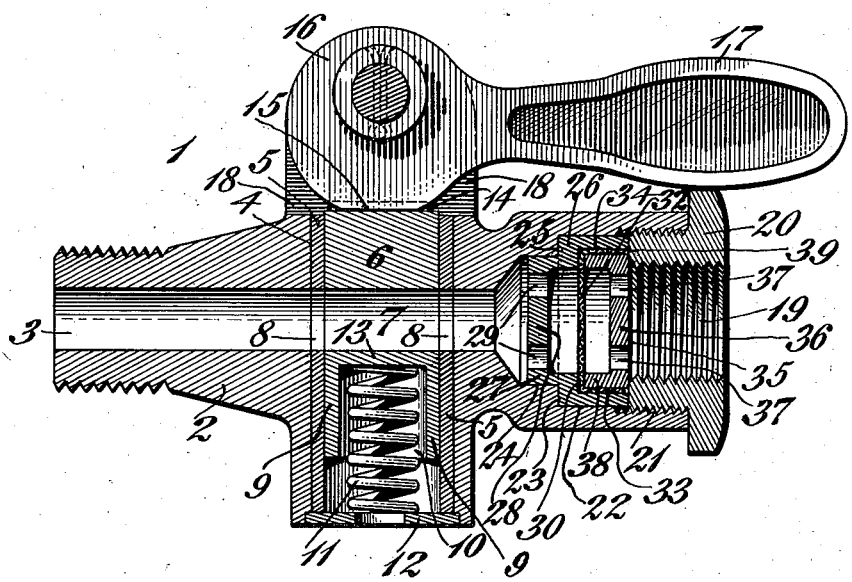
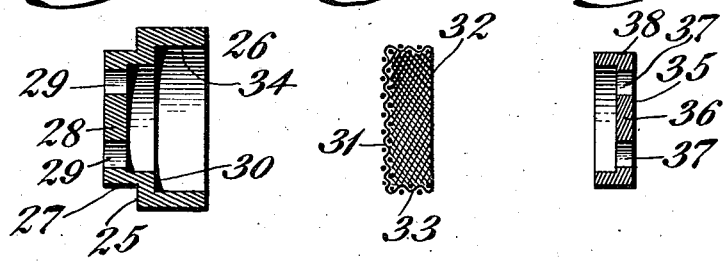
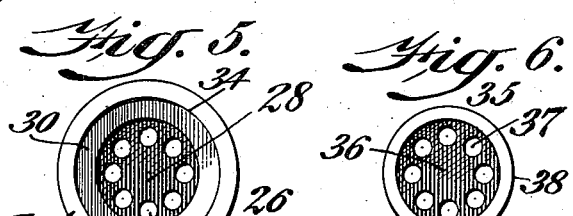
WITNESSES
INVENTOR
Charles H. Haeseler.
BY
ATTORNEYS

UNITED STATES PATENT OFFICE.

CHARLES HERMAN HAESELER, OF PHILADELPHIA, PENNSYLVANIA.

VALVE OR COCK AND STRAINER THEREFOR.

1,185,309. Specification of Letters Patent. Patented May 30, 1916.

Original application filed July 10, 1915, Serial No. 39,060. Divided and this application filed October 25, 1915. Serial No. 57,738.

*To all whom it may concern:*

Be it known that I, CHARLES HERMAN HAESELER, a citizen of the United States, residing in the city and county of Philadelphia, State of Pennsylvania, have invented a new and useful Valve or Cock and Strainer Therefor, of which the following is a specification.

My invention relates to a novel construction of valve or cock which is adapted to be inserted in a hose or conduit to control the flow of compressed air or other motive fluid to pneumatically operated implements, such as pneumatic hammers, riveters, drills and the like, this application being a division of a contemporaneously pending application filed by me on July 10th, 1915, Serial #39,060, wherein I have described and broadly claimed the valve or cock proper, my present invention relating more particularly to the construction of the valve body casing and special arrangement of air strainer or straining devices, which are located in the inlet end of said valve body.

To the above ends my invention consists of a novel construction of a valve body or casing having an enlarged chamber at its inlet end and of a novel construction of strainer and its adjuncts coacting therewith, said strainer being provided with a removable screen which prevents dirt or scale from the pipe line or particles of rubber from the hose entering the drill or other pneumatically operated implement, said screen being securely held in position within the valve body and protected on both sides from puncture by apertured partitions which permit a free flow of the air or other motive fluid to the desired point and yet prevent the fine mesh of the screen from becoming damaged, the strainer being readily accessible for the purpose of inspection or repairs and being readily removed and cleaned.

To the above ends my invention consists of a novel construction of a strainer device and its adjuncts for a valve or cock for controlling air or other motive fluid at a high pressure, all as will be hereinafter fully set forth.

For the purpose of illustrating my invention, I have shown in the accompanying drawing a preferred embodiment, which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a longitudinal sectional view of a valve and its adjuncts showing particularly a novel air straining device embodying my invention. Fig. 2 represents a sectional view of the strainer body in detached position. Fig. 3 represents a vertical sectional view of the screen of the strainer employed, in detached position. Fig. 4 represents a sectional view of the follower ring for the strainer in detached position. Fig. 5 represents an end elevation of Fig. 2. Fig. 6 represents an end elevation of Fig. 4.

Similar numerals of reference indicate corresponding parts in the figures.

Referring to the drawings 1 designates my novel construction of valve or cock, having my novel straining device applied thereto, the same comprising the valve body or casing 2 having the bore 3 extending longitudinally therethrough, the left hand extremity of said body being exteriorly threaded and adapted to be screwed directly into engagement with the casing of the drill or other pneumatically operated implement (not shown) to which my device is applicable.

4 designates a transverse passage extending at an angle to the longitudinal bore 3 and having therein a bronze or other bushing 5 which is forced in any suitable manner into the body or casing 2, which is preferably a drop forged steel body.

6 designates the valve plug proper which is preferably made of uniform diameter, hardened and ground and adapted to move vertically in said bushing 5, said valve plug having the port 7 therethrough which alines with the bore 3, when the valve is open, it being understood that the bushing 5 has ports 8 therein, so as to permit the passage of the motive fluid therethrough when the parts are in the position seen in Fig. 1.

I preferably construct the bottom of the valve plug 6 with an annular depending wall 9, whereby a chamber 10 is formed for the reception of the spring or other tension device 11, the lower end of said spring abutting on the wall 12 while its upper end abuts against the wall 13 of the valve plug 6.

The top of the valve plug 6 is provided with a groove 14, which is adapted to coact with the flattened face 15 of the eccentrically mounted disk 16, which has a handle 17 secured thereto, said handle and disk being preferably of one piece and said handle extending always in longitudinal alinement with the valve body and hose line. I preferably mount the eccentric disk 16 and its adjuncts in the ears 18 which in the present instance extend upwardly from the valve body 2.

The foregoing construction is particularly described in my copending application hereinbefore referred to and requires no further description, as the construction or mode of operation will be apparent to those skilled in the art.

The straining devices to which the present invention more particularly relates will now be described, reference being had to the right-hand side of Fig. 1. The discharge end of the air hose is inserted in the threaded bushing 19 having the flange 20, said bushing being exteriorly threaded to engage its interiorly threaded seat 21 in the valve body. It will be noted that the right-hand or inlet end of the valve body or casing 2 is provided with an enlarged chamber 22 having a shoulder 23 from which extends the reduced bore 24. Against the shoulder 23 contacts the shoulder 25 of the strainer body or holder 26, the latter being provided with the forwardly extending reduced neck 27 which engages the bore 24, said forward extension having the partition 28 provided with the ports 29 therein.

The strainer body 26 has an annular inner wall 34 and an internal shoulder 30 therein which form a seat upon which is supported the screen 32, the same being of cup-shape and having an annular side wall 33 and an upright wall 31 which contact with the seat referred to of said strainer body.

When the parts are in assembled position the fine mesh screen 32 is located with respect to the strainer body 26, as seen in Fig. 1, and the follower ring 35 which comprises the partition 36 having the ports 37 therein and the annular outer flange 38 is also placed in position, as seen in Fig. 1, and upon screwing in position the nipple 20, it will be seen that the inner portion 39 thereof, contacts with the edge of the partition 36 and with the contiguous edge of the annular wall 34, so that the strainer body 26, screen 32 and the ring 35 will be tightly held in assembled position and the compressed air or other motive fluid can easily flow through the ports 37, the fine mesh screen 31 and ports 29 through the port in the valve plug to the tool or implement to be operated, as for example a pneumatic drill.

When the parts constituting the straining device are in assembled position, as seen in Fig. 1, it will be seen that by reason of the employment of the apertured partitions 36 and 28 there is no likelihood of the screen 31 being punched or damaged by the insertion of a rod or other implement in either direction through the valve body 2 and when it is desired to remove or have access to the screen for the purpose of inspection, repairs, cleaning or to replace an old screen with a new one, it can readily be done by unscrewing the thimble 20 whereupon the screen, the screen holder 26 and the follower ring 35 will be readily accessible.

By providing the forward portion of the screen holder 26 with the reduced extension 27, it will be seen that provision is made for the parts to be assembled properly, even by unskilled labor, since the extension 27 can only be positioned against the bore 24 by properly assembling the parts in the consecutive order, as seen in Fig. 1. In practice I prefer to screw the valve body directly into the cylinder of the air drill so that the handle 17 may be conveniently near the operator and it will be seen that when the valve is open not only is the valve plug positively locked in open position for the desired period, but since the handle 17 extends longitudinally of the valve body or casing or in alinement with the hose, there is no liability of its being accidentally turned when the air hose is dragged along the ground, since the handle is always in alinement with the hose and not crosswise thereto, and furthermore the vibration of the drill or other implement to which my device is connected cannot partially shut off the air since the handle will positively remain locked in the desired position.

By the employment of the strainer, dirt or scale from the pipe line or particles of rubber from the hose are prevented from entering the drill or other pneumatically operated implement, an advantageous feature which will be apparent to those skilled in the art.

It will be understood that while my device is especially adapted for use in screening and controlling compressed air at a comparatively high pressure, approximately 100 lbs. to the square inch, it is also capable of use under other conditions, as will be evident.

It will now be apparent that I have devised a novel and useful construction of a valve or cock and strainer therefor which embodies the features of advantage enumerated as desirable in the statement of the invention and the above description, and while I have, in the present instance shown and described the preferred embodiments thereof which will give in practice satisfactory and reliable results, it is to be understood that the same are susceptible of modication in various particulars without departing from the spirit or scope of the invention or sacrificing any of its advantages.

Having thus described my invention, what I claim as new and desire to secure by Letters Patent is:—

1. In an organized valve for the purpose described, a casing having an inlet member with a chamber of two diameters with an intermediate shoulder, a strainer body having two diameters fitting the diameters of said chamber and with a shoulder engaging the first-named shoulder, a cup-shaped screen within the larger diameter of said strainer body, a partition within the cup-shaped screen and a nipple threaded in the said inlet member and bearing against the outer end of said strainer body, screen and partition.

2. In an organized valve for the purpose described, a casing having an inlet member of two diameters with an intermediate shoulder, a strainer body of two diameters with a shoulder, the smaller portion of said body having an end with perforations, a cup-shaped screen within the strainer body with its disk portion bearing against the inner shoulder of said body, a cup-shaped member within the larger bore of said strainer body with its inner end bearing against the disk portion of said screen and its outer end provided with perforations, and a nipple threaded into the outer end of said inlet portion with its inner end bearing against the outer end of said strainer body, screen and cup-shaped member.

CHARLES HERMAN HAESELER.

Witnesses:
H. S. FAIRBANKS,
C. D. McVAY.